United States Patent Office 3,343,919
Patented Sept. 26, 1967

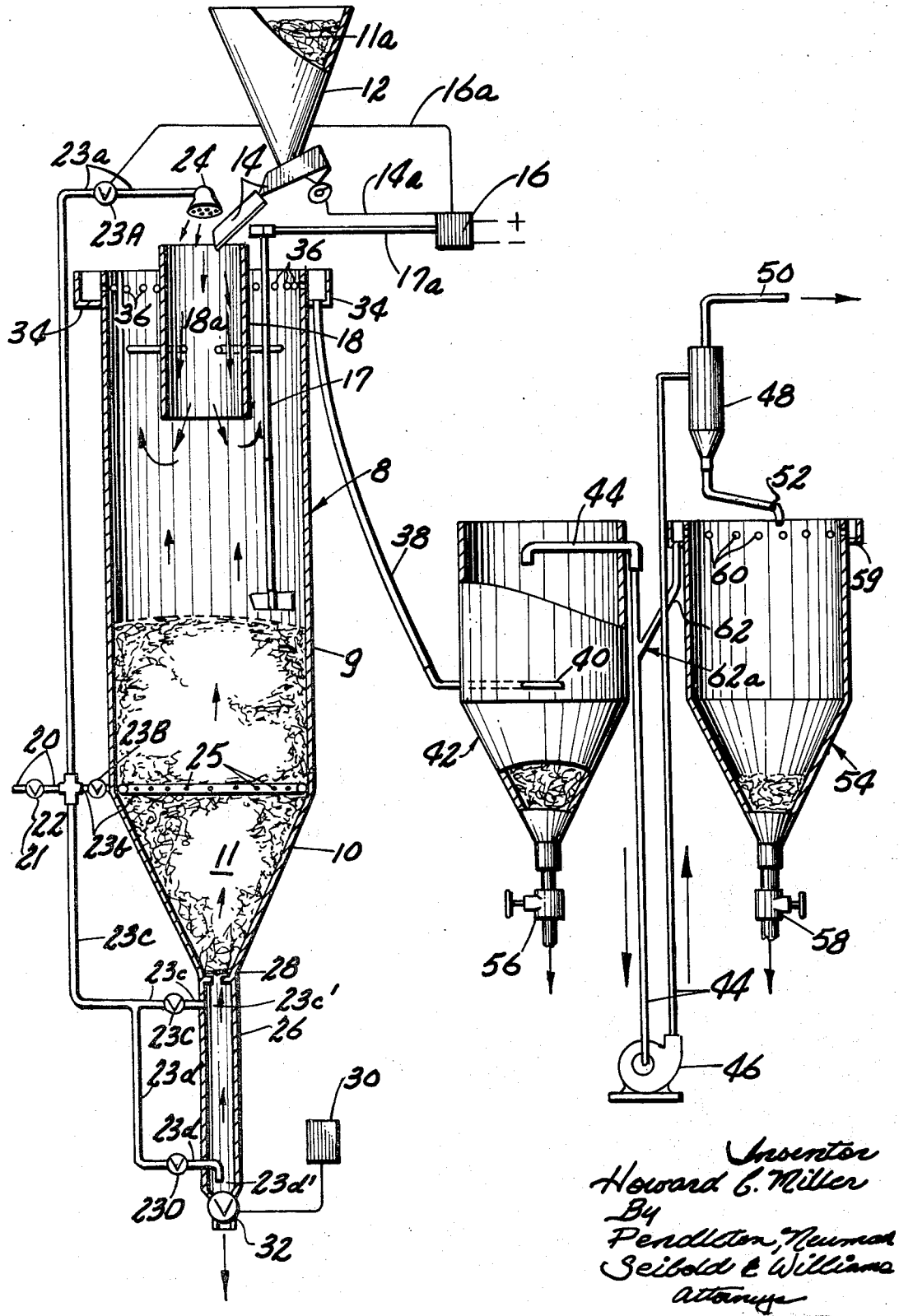

3,343,919
SALT DISSOLVER HAVING COORDINATED CONCOMITANT SALT AND WATER FEED
Howard C. Miller, Mount Prospect, Ill., assignor to Morton Salt Company, Chicago, Ill., a corporation of Delaware
Filed Feb. 1, 1965, Ser. No. 429,283
5 Claims. (Cl. 23—270)

This invention relates to an improved apparatus and method for dissolving rock salt and separating impurities therefrom in the production of pure salt brine.

The term "salt" as used herein means sodium chloride and the term "brine" means an aqueous solution of sodium chloride or salt.

In the manufacture of chlorine, sodium and other chemicals derived from sodium chloride, as well as in many other industrial applications, a brine is first made from crude rock salt, which brine must be treated with costly chemicals in order to remove dissolved impurities, particularly calcium sulfate, which is a major impurity in most commercial grades of rock salt. Calcium sulfate is generally present as discrete particles which adhere to the external surfaces of the crude rock salt crystals and are distributed throughout the crystal structure. Since calcium sulfate is both less soluble and more slowly soluble in water than is rock salt, many attempts have been made in the past to obtain a pure saturated brine by utilizing the technique of rapid aqueous flow through a bed of salt with the concomitant separation of calcium sulfate particles which are released in the dissolution process. While some of the techniques used have been partially successful, all have had certain inherent disadvantages. Some of the disadvantages encountered in large industrial applications of dissolvers designed to give a high purity brine have been that (1) They can be used successfully only on certain grades or sizes of rock salt, which grades or sizes are frequently difficult or impossible to supply economically in large quantities; (2) the rate of brine production per given unit size is relatively low; (3) the purity of brine produced is unsatisfactory; (4) the attention of a skilled operator is required to keep the unit operating properly; and (5) the loss of salt per unit apparatus is relatively great. Attempts have been made in the past to overcome one or more of these deficiencies, however the prior art has failed to provide a remedy for the above enumerated defects.

From the foregoing description of the difficulties encountered in commercial operations where it is desirable to make a high purity brine from impure rock salt, it is apparent that the technology is more difficult than would appear to one unskilled in the art. It is fairly easy in the laboratory and in small commercial units to rapidly dissolve rock salt and rapidly separate the brine formed from the calcium sulfate impurity released as the salt dissolves. However, in large commercial operations when it is desirable to dissolve 200 to 400 tons per day of rock salt of various grades and sizes while maintaining the production of a high purity brine, the following are basic requirements: (1) The dissolving rate must be rapid, i.e., the contact time of the solvent (water) with the salt must be maintained at a minimum to insure minimum calcium sulfate dissolution. By minimum contact time is meant that time of contact of a rapidly flowing stream of water with a salt bed which will just give a saturated brine. For maximum efficiency, the flow should be such that any reduction in contact time will give an undersaturated brine. (2) The accumulation of solid calcium sulfate released in the salt bed when the salt dissolves must be continually, effectively and automatically removed from the salt bed of the dissolver to prevent increased dissolution of calcium sulfate in brine and to prevent clogging of the salt bed and physical contamination of the brine by adventitious calcium sulfate. (3) Any solid undissolved calcium sulfate which is carried with the brine from the dissolver must be effectively and quickly separated from the brine. (4) The removal of deposited calcium sulfate must be effected with a minimum loss of salt to insure an efficient conversion of salt to saturated brine.

Accordingly, it would be desirable to devise an automatic salt dissolving apparatus and process, using the same to carry out the rapid dissolution of crude rock salt of varying grades under conditions which would produce a saturated pure brine.

It is therefore an object of the present invention to provide an automatic apparatus and process for the production of pure brine by the dissolution of rock salt with a minimum dissolution of calcium sulfate and with a relatively minor loss of salt to attain an efficient conversion of salt to saturated brine.

It is another object of the present invention to provide an automatic apparatus for the production of pure brine at a high rate.

It is a further object of the present invention to provide an automatic apparatus and process for the production of pure brine which can be used in connection with any commercial grade or size of rock salt or mixtures thereof.

It is a still further object of the present invention to provide an automatically controlled apparatus useful in the production of pure brine by the dissolution of rock salt, which apparatus is self-cleaning with respect to the build-up of solid calcium sulfate and other solid impurities.

It is still another object of the present invention to provide an automatic apparatus for the production of pure brine by the dissolution of rock salt, which operates at a high capacity. These and other objects of the present invention will be more readily understood by reference to the following specification and claims.

In one broad form the present invention comprises a process for forming brine from crude crushed salt containing solid calcium sulfate and other impurities which comprises maintaining a body of crude salt in a dissolving zone, contacting the crude salt with flowing water to form a body of saturated brine in contact with the body of salt, conducting the brine so formed to a removal zone for further separation of solid particles, concomitantly maintaining the body of salt by combining crude salt and water in a predissolving zone and conducting the combined salt, water and resulting brine to the main body of salt in the dissolving zone, and automatically removing on a continuous basis solid calcium sulfate and other impurities from the dissolving zone during the salt dissolution process.

The invention also relates to apparatus for carrying out the above process.

Referring to the drawing:

The figure is a schematic illustration in partial section of the salt dissolver apparatus of the present invention comprising a salt dissolving tank 8 in vertical cross section, having a cylindrical body portion 9 and a conical (inverted) bottom portion 10 adapted to hold a body of crude crushed rock salt 11 containing impurities such as calcium sulfate. Salt 11a is maintained in a hopper 12 and discharged into the salt dissolver 8 through a regulated dispensing means 14 such as a vibrating feeder chute controlled via line 14a by automatic coordinating device 16. The level of the salt bed is determined by sensing device 17, also connected via 17a to coordinator 16. The salt is adapted to discharge into a cylindrical baffle chamber 18 maintained in the upper regions of the body portion 9 of chamber 8. The baffle chamber 18 illustrated is cylindrical and open at both ends, although other configurations can be used with equal effect. It has a medial location with respect to body 9 to define a concentric chamber or predissolving zone 18a, generally isolated from the mass of fluid brine contained in the dissolver tank 8.

Dissolving water is provided through conduit 20 fitted with control valve 21 and dividing at 22 to lines 23a, 23b, 23c and 23d. The water conduits 23b, 23c and 23d discharge into the dissolver tank through intermediate valves 23B, 23C and 23D. Conduit 23a discharges into the baffle or center well 18 through control valve 23A and spray head 24. Valve 23A is connected to and controlled via lead 16a by feed coordinator 16. Valve 23b and conduits 23b discharge into the body 9 at a number of discharge openings 25, which discharge openings are uniformly distributed across the interior of body 9 to provide a uniform discharge of water into and through salt body 11. A conduit 26 is affixed to and communicates with the bottom 10 of chamber 8 and is also referred to as a salt-sludge leg. A constriction or orifice 28 is provided at the juncture of 26 and 10. The salt-sludge leg 26 is equipped with timing means 30 adapted to coordinate with dump valve 32 through a coordinating automatic mechanism (not shown). A collector trough 34 surmounts the upper extremities of tank 8 in annular fashion adapted to receive fluid overflow in tank body 9 through orifices 36 and the fluid in the collector trough 34 passes through conduit 38 to settling tank 42 having the same general shape as tank 8, said fluid discharging tangentially in the lower median portion thereof through inlet 40. Tank 42 is provided with a discharge conduit 44 fitted with a pump 46 and passing to a liquid-solids separator 48 which separates and passes clear brine through line 50 to storage, and sludge residue through line 52 to a second settling tank 54 for further brine salvage. Valves 56 and 58 provide means for discharging solid materials which accumulate in the bottom of the settling tanks 42 and 54. Tank 54 is provided with an annular collector trough 59 which is adapted to collect brine overflow through orifices 60 in trough 59 and through conduit 62 which joins and discharges into line 44 at 62a.

In operation the salt dissolver 8 is charged with a body of salt 11 at a predetermined level and water passing through conduits 22, 23a, 23b, 23c and 23d and apertures 25 passes through the body of salt to dissolve the same and form a salt brine and overflows tank 8 through trough 34 through conduit 38 to settling tank 42. Preferably, the salt brine from the salt dissolver 8 is introduced into settling tank 42 in a tangential manner to effect a more efficient separation of solid impurities. However, it is understood that the particular mode of brine entry into settling tank 42 can be conveniently effected in the ordinary manner without impairing the operability of the present invention. After settling, to further separate the solid impurities such as calcium sulfate from the brine, brine passes through overflow 44 to liquid-solid separator 48, which passes purified brine to storage via conduit 50 and sludge to settling tank 54, where overflow supernate brine from trough 59 is recycled to the separator via lines 62 and 44.

In operation, the upward flow of water through the salt dissolver causes a gradual subsidence of salt body 11. The major proportion of solid calcium sulfate and other impurities remains undissolved and gravitates to the bottom of salt bed 11 in the area immediately above constriction 28 in salt sludge leg 26. The upsurge of water through the salt sludge leg at points 23c' and 23d' respectively maintains a positive pressure against salt body 11. This pressure, in conjunction with constriction 28, is sufficient to prevent the salt body from occupying the salt sludge leg during operation. Constriction 28 is conveniently small enough to provide a base or support ledge for the salt body and yet large enough to permit sludge deposition therethrough into the sale sludge leg when valve 32 is open. Timing means 30 is preset to open and close valve 32. Valve 32 is opened briefly to allow accumulated calcium sulfate, brine and some crude salt to be drawn into the salt sludge leg. Valve 32 is then closed, trapping the impurities and salt for a period of time long enough to enable the flow of water through the salt sludge leg to dissolve a substantial portion of the crude salt therein and flush back into the salt body above any brine present in the salt sludge leg. At the end of this time, the valve is again opened to permit disposal of accumulated calcium sulfate and other solid impurities and allow the intake of more calcium sulfate, other solid impurities, salt and brine into the salt sludge leg. Thus timing means 30 is concatenated with the operation of the apparatus to periodically open and close valve 32 and effect the continuous and automatic removal of calcium sulfate through the salt sludge leg with a minimum loss of salt during the production of saturated salt brine.

Although the opening and closing of the drain valve in the salt sludge leg has been accomplished by means of a timing device, it is obvious that other means may be employed. For example, a salinity cell which senses and is responsive to salt concentration within the salt sludge leg may be operatively connected to both the salt sludge leg and valve 32. Thus, the salinity cell could be set to open valve 32 when the concentration of salt within salt sludge leg 26 is reduced to a predetermined minimum and to close valve 32 when the concentration of salt within the salt sludge leg reaches a predetermined maximum. Alternately, other sensing devices may be employed which perform the function of opening and closing drain valve 32 at the proper intervals.

The salt sludge leg is conveniently constructed of any corrosion resistant material. Plastic has been found to be most useful, although a leg of stainless steel with plastic sight glasses at the top and bottom of the leg for visual observation of sludge deposition and removal is quite satisfactory. The length of the salt sludge leg is not critical. However, it should be proportioned to the size of the salt dissolver to provide the most efficient operation.

The flow of water into the dissolver is regulated to produce a saturated brine overflow without permitting excessive residence time to permit dissolution of calcium sulfate to any substantial degree. During the salt dissolving process the volume of the solid salt bed shrinks and the level of the bed falls. This actuates the sensing device 17 which, through the coordinator 16, introduces concomitantly salt and water at 14 and 24, respectively, into center well 18. Center well 18 functions as a predissolving zone 18a, in which salt fines, a natural component of crude salt, are dissolved prior to entry into the main salt bed and are thus prevented from being carried over as a suspension in the effluent brine from tank 8.

Any impurities entrained in the overflow brine from tank 8 are removed in settling tanks 42 and 54, and are vented at valves 56 and 58 to minimize contact with the brine.

In the commercial operation of the apparatus and method hereinbefore described and with a salt dissolving tank having a diameter of about four feet and a height of the cylindrical section of about ten feet, a production rate of approximately 150 gallons per minute of saturated brine has been obtained on a continuous basis when operating on various commercial grade sized (0.5 inch to fine) of impure rock salt. When operating on a fine crushed rock salt, the depth of the bed in the dissolver is decreased by lowering the position in the dissolving tank of device 17. When operating on coarse grades of salt, the bed depth is increased to that point at which a saturated brine is obtained when operating at a relatively high water flow rate.

When operating on a fine crushed commercial grade of rock salt identified in the trade as F. C. rock salt, a bed depth of approximately 3 feet of salt in the dissolving zone is used. At a flow rate of about 150 gallons per minute in a four foot diameter dissolving tank having a height of the cylindrical section of about 10 feet, this represents a contact time of approximately one minute of the solvent with the salt bed.

In one test in the apparatus described above, a 14 hour run was made at a brine flow rate of approximately 100 gallons per minute on an impure rock salt containing 6.74 percent calcium sulfate. Brine purity checks throughout the run showed an average pick-up of calcium sulfate of approximately 0.2 to 0.3 gram per liter. Under similar operating conditions in a conventional unit, a brine containing from 1.0 to 2.0 grams per liter calcium sulfate was the best brine purity which could be obtained.

In one test, checks on the operations of the apparatus of the present invention were made for loss of salt from the unit. A sodium chloride analysis of the solids being automatically discharged from the bottom of the salt-sludge leg showed only 0.27 percent sodium chloride. At the same time, checks were made for the existence of fine salt carry-over in the brine overflow from the dissolver unit. The major portion of the solids carry-over consisted of particles of anhydrous calcium sulfate.

In plant tests it was demonstrated that the unit could not be operated on fine crushed rock salt at a desirable rate of production without the injection of dissolving water into predissolving zone 18a of the unit. The introduction of water into predissolving zone 18a is therefore necessary to soak or predissolve salt being fed into the tank in order to minimize the physical carry-over in the effluent brine of finely divided salt.

It should be emphasized that in one broad form the present invention is the coordinated and combined operation of the various elements of the salt dissolver apparatus. Particularly the invention resides in the cooperation of elements such as the maintenance of a predetermined salt body level, the utilization of a center well or predissolving zone to prevent salt fines from being carried out of the brine overflowing the salt dissolver tank, the provision of a salt sludge leg for automatically removing the calcium sulfate impurity and the continuous collection of overflowing saturated brine for further treatment.

While several particular embodiments of this invention are shown above, it will be understood, of course, that the invention is not limited thereto, since many modifications may be made, and it is contemplated, therefore, by the appended claims, to cover any such modifications as fall within the true spirit and scope of this invention.

I claim:

1. A salt dissolving apparatus comprising a vertical dissolving chamber for containing a body of salt in contact with supernatant brine, a plurality of means for introducing water into said chamber beneath the surface of the body of salt, vertical conduit means located at the top and partially within said vertical chamber defining a predissolving zone, means for feeding salt into said predissolving zone, means for feeding water into said predissolving zone, means for sensing the height of the body of salt in the dissolving chamber, coordinating means responsive to said level sensing means for controlling feed of salt and fresh water concomitantly into the predissolving zone to control and coordinate the amount of salt and the relative amounts of salt and water fed to the predissolving zone to maintain the body of salt at a predetermined level, means for conducting the admixture of salt, water and brine from the predissolving zone to the body of salt within said chamber, means connected with the bottom of said chamber to remove solid impurities, and means connected adjacent the top of said chamber and removed from the discharge of the predissolving zone for removing brine from said chamber.

2. A salt dissolving apparatus as in claim 1 wherein said solids impurity removal means includes a washing chamber connected with the lower portion of said chamber for collecting and containing solid impurities, a constriction between the dissolving and the washing chamber small enough to support said body of salt and large enough to permit sludge to pass therethrough, discharge means connected with the bottom of said washing chamber, automatic timer means for controlling said discharge means to discharge sludge collected in said washing chamber at predetermined time intervals, and water inlet means in said washing chamber for introducing wash water thereto.

3. In a salt dissolving apparatus as in claim 1 wherein said vertical conduit means provides a baffle separating the contents thereof from the point of discharge of brine from the top of said dissolving chamber.

4. A salt dissolving apparatus comprising a vertical dissolving chamber for containing a body of crude salt containing impurities in contact with supernate brine, a plurality of water inlet means connected to the chamber for introducing fresh water into said chamber below the surface of said body of salt, vertical conduit means defining a predissolving zone mounted at the upper portion of the chamber, salt supply means disposed above the chamber for discharging salt into said predissolving zone, water inlet means for discharging water into said predissolving zone, means operatively connected to the salt supply means and to the water inlet means for coordinating the supply of salt and fresh water concomitantly into the predissolving zone means for sensing the level of the body of salt in the dissolving chamber, said coordinating means being responsive to the level of the body of salt within the chamber and adapted to control the salt feed and the water feed so as to maintain the body of salt at a predetermined level, brine collecting and discharge means disposed at the upper portion of the dissolving chamber above the bottom end of said conduit means, a salt sludge leg connected to the bottom of the chamber to remove solid impurities therefrom, constriction means between said salt sludge leg and said dissolving chamber small enough to support said body of salt and large enough to permit sludge to pass therethrough, water inlet means to introduce wash water into said salt sludge leg, and discharge means in the bottom of said salt sludge leg to periodically discharge collected sludge therefrom.

5. A salt dissolving apparatus for the production of pure brine from crude salt containing impurities as in claim 4 wherein said salt sludge leg collects and discharges solid impurities from the chamber at a rate coordinated with the rate of water and salt introduction into the chamber and with the rate of brine discharge from the chamber.

References Cited

UNITED STATES PATENTS

| 2,734,804 | 2/1956 | Courthope | 23—312 X |
| 3,071,450 | 1/1963 | Martin | 23—312 X |
| 3,080,220 | 3/1963 | Lagatski | 23—312 |
| 3,130,016 | 4/1964 | Grier | 23—312 |
| 3,155,697 | 11/1964 | Jurgen-Lohmann | 23—270 X |
| 3,236,609 | 2/1966 | MacKinnon | 23—312 |
| 3,281,212 | 10/1966 | MacKinnon | 23—272 |
| 3,309,177 | 3/1967 | Goery | 23—270 |

NORMAN YUDKOFF, *Primary Examiner.*

S. EMERY, *Assistant Examiner.*

UNITED STATES PATENT OFFICE
CERTIFICATE OF CORRECTION

Patent No. 3,343,919            September 26, 1967

Howard C. Miller

It is hereby certified that error appears in the above numbered patent requiring correction and that the said Letters Patent should read as corrected below.

In the heading to the printed specification, lines 4 to 6, for "Morton Salt Company, Chicago, Ill., a corporation of Delaware" read -- Morton International, Inc., a corporation of Delaware --.

Signed and sealed this 12th day of November 1968.

(SEAL)
Attest:

Edward M. Fletcher, Jr.
Attesting Officer

EDWARD J. BRENNER
Commissioner of Patents